United States Patent
Moon

(10) Patent No.: US 10,791,573 B2
(45) Date of Patent: Sep. 29, 2020

(54) RANDOM ACCESS CHANNEL TRANSMISSION METHOD AND DEVICE

(71) Applicant: INDUSTRY-UNIVERSITY COOPERATION FOUNDATION HANYANG UNIVERSITY, Seoul (KR)

(72) Inventor: Hichan Moon, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 15/503,282

(22) PCT Filed: Aug. 5, 2015

(86) PCT No.: PCT/KR2015/008217
§ 371 (c)(1),
(2) Date: Feb. 10, 2017

(87) PCT Pub. No.: WO2016/024757
PCT Pub. Date: Feb. 18, 2016

(65) Prior Publication Data
US 2018/0213570 A1    Jul. 26, 2018

(30) Foreign Application Priority Data

Aug. 11, 2014 (KR) .................... 10-2014-0103873
Dec. 17, 2014 (KR) .................... 10-2014-0181988

(51) Int. Cl.
*H04W 74/08*    (2009.01)
*H04L 5/00*     (2006.01)
*H04L 5/14*     (2006.01)

(52) U.S. Cl.
CPC ....... *H04W 74/0833* (2013.01); *H04L 5/0048* (2013.01); *H04L 5/14* (2013.01)

(58) Field of Classification Search
CPC ..... H04W 74/0833; H04L 5/14; H04L 5/0048
(Continued)

(56) References Cited

U.S. PATENT DOCUMENTS

| 6,456,652 | B1 | 9/2002 | Kim et al. |
| 8,149,809 | B2 * | 4/2012 | Kazmi .................. H04L 1/0026 370/341 |

(Continued)

FOREIGN PATENT DOCUMENTS

| CN | 101836479 A | 9/2010 |
| CN | 102045743 A | 5/2011 |

(Continued)

OTHER PUBLICATIONS

International Search Report for PCT/KR2015/008217, dated Dec. 1, 2015.

*Primary Examiner* — Kwang B Yao
*Assistant Examiner* — Syed M Bokhari
(74) *Attorney, Agent, or Firm* — Sughrue Mion, PLLC

(57) ABSTRACT

The present invention relates to random access channel transmission technology in a wireless communication system. More specifically, the present invention relates to a device and method for a terminal operating in a frequency division duplex (FDD) mode to transmit a random access channel on the basis of the channel quality of a downlink or uplink channel. In particular, the present invention provides a device and a method by which a terminal transmits a random access channel in an FDD mode, the method comprising the steps of: receiving, through a transmission channel, a reference signal for measuring the quality of the transmission channel which is transmitting a random access (Continued)

channel; measuring the quality of the transmission channel by using the reference signal, and determining whether there is a random access channel transmission; and transmitting a random access channel through the transmission channel.

17 Claims, 12 Drawing Sheets

(58) Field of Classification Search
USPC ........ 370/281, 341, 315, 267, 329, 252, 280
See application file for complete search history.

(56) References Cited

U.S. PATENT DOCUMENTS

| | | | |
|---|---|---|---|
| 2002/0172217 A1 | 11/2002 | Kadaba et al. | |
| 2005/0073985 A1 | 4/2005 | Heo et al. | |
| 2010/0215114 A1* | 8/2010 | Kim | H04B 7/0413 375/267 |
| 2010/0296472 A1* | 11/2010 | Lee | H04L 1/0026 370/329 |
| 2010/0322115 A1* | 12/2010 | Wei | H04L 5/0044 370/280 |
| 2011/0243026 A1* | 10/2011 | Kim | H04B 7/0632 370/252 |
| 2012/0044894 A1* | 2/2012 | Ko | H04L 1/0026 370/329 |
| 2013/0064174 A1* | 3/2013 | Kim | H04B 7/15528 370/315 |
| 2013/0129018 A1* | 5/2013 | Ko | H04B 7/0478 375/296 |
| 2014/0010129 A1* | 1/2014 | Rubin | H04W 16/14 370/280 |
| 2014/0241171 A1 | 8/2014 | Moon | |
| 2016/0149687 A1* | 5/2016 | Lei | H04W 16/10 370/280 |
| 2018/0070386 A1* | 3/2018 | Zhang | H04W 52/50 |

FOREIGN PATENT DOCUMENTS

| | | |
|---|---|---|
| CN | 103974445 A | 8/2014 |
| KR | 10-0259282 B1 | 6/2000 |
| KR | 10-0278019 B1 | 1/2001 |
| KR | 10-1042814 B1 | 6/2011 |
| KR | 10-2013-0033839 A | 4/2013 |

* cited by examiner (A)

(B)

RANDOM ACCESS CHANNEL TRANSMISSION METHOD AND DEVICE

TECHNICAL FIELD

The present invention relates to a random access channel transmission technology in a wireless communication system. More particularly, the present invention relates to a method and an apparatus in which a terminal operating in the FDD (Frequency Division Duplex) mode transmits the random access channel based on a channel quality of a downlink channel or an uplink channel.

BACKGROUND ART

In a wireless communication system such as W-CDMA, LTE, LTE-Advanced of the 3GPP or cdma2000 of the 3GPP2, the terminal can perform a random access procedure in order to perform communication with a base station. The random access procedure is the procedure in which the terminal forms a link with the base station at a time when the terminal does not link with the base station, and includes a variety of ways such as a contention-based random access and a non-contention-based random access.

The random access procedure is performed by the process in which the terminal transmits a random access preamble to the base station through the random access channel and the base station transmits a random access response to the terminal to order to check the random access preamble of the terminal.

In this specification, what the terminal transmits the random access preamble through the random access channel is referred as the transmission of the random access channel. The terminal and the base station may perform an initial communication procedure through the random access procedure in the wireless communication system.

On the other hand, in the case of the LTE system, the terminal is operable to one of a TDD (Time Division Duplex) mode and a FDD mode according to the communication-duplex mode. The TDD mode refers to a mode in which a downlink channel and an uplink channel are configured in a single frequency band in a time division manner. The FDD mode refers to a mode in which a frequency band of a downlink channel and a frequency band of an uplink channel are separated.

For a terminal operating in a FDD mode, the frequency band of the downlink channel and the frequency band of the uplink channel is configured separately at predetermined intervals. Thus, the conventional random access channel was transmitted to the base station through the uplink channel.

However, conventionally, when an event for the transmission of the random access channel has occurred regardless of the channel status for the uplink channel through which the terminal transmits the random access channel, it transmitted the random access channel to the base station. This results in a problem that the transmission of the random access channel may fail due to a disaster situation or the low transmission power of the terminal when the terminal is located far from the base station and the power consumption of the terminal is increased.

In addition, in a case required for preventing the power consumption of the terminal and performing efficient communication such as the disaster situation, there is a problem that the transmission power was wasted because the terminal transmitted the random access channel through the uplink channel based on measuring the channel quality of the downlink channel.

DETAILED DESCRIPTION OF THE INVENTION

Technical Problem

The present invention devised in the above-described situation provides a method and an apparatus in which the terminal operating in the FDD mode accurately measures the channel quality of the transmission channel through which it transmits the random access channel, and performs the random access procedure only if the channel status is good, thereby preventing the waste of the transmission power.

In addition, the present invention provides a method and an apparatus in which the terminal determines whether or not to transmit the random access channel according to channel status when the terminal is located far from the base station such as the disaster so that it may improve the coverage of the random access channel of the terminal.

Technical Solution

In accordance with an aspect of the present disclosure, there is provided a method for transmitting a random access channel by a terminal in the FDD (Frequency Division Duplex) mode. The method comprises receiving, through a transmission channel, a signal for measuring the quality of a transmission channel to transmits a random access channel; measuring the quality of the transmission channel using the signal, and determining whether or not to transmit the random access channel; and transmitting the random access channel through the transmission channel. It may transmit a reference signal as the signal for measuring the quality of the transmission channel. It may transmit a short message comprising the control information with a constant size.

In accordance with another aspect of the present disclosure, there is provided a method for receiving a random access channel by a base station in the FDD (Frequency Division Duplex) mode. The method comprises: generating a signal for measuring the quality of a transmission channel at which a terminal transmits a random access channel through the transmission channel; transmitting the signal through the transmission channel; and receiving the random access channel through the transmission channel. It may transmit the reference as the signal. It may transmit a short message comprising control information along with the reference signal.

In accordance with still another aspect of the present disclosure, there is provided a terminal for transmitting a random access channel in the FDD (Frequency Division Duplex) mode. The terminal comprises: a receiver for receiving, through a transmission channel, a signal for measuring the quality of a transmission channel to transmits a random access channel; a controller for measuring the quality of the transmission channel using the signal, and determining whether or not to transmit the random access channel; and a transmitter for transmitting the random access channel through the transmission channel. It may receive the reference signal as the signal for measuring the quality of the transmission channel.

In accordance with yet another aspect of the present disclosure, there is provided a base station for receiving a random access channel in the FDD (Frequency Division Duplex) mode. The base station comprises: a controller for generating a reference signal for measuring the quality of a transmission channel at which a terminal transmits a random access channel through the transmission channel; a transmitter for transmitting the reference signal through the transmission channel; and a receiver for receiving the random access channel through the transmission channel. It may transmit a reference signal as the signal for measuring the quality of the transmission channel. It may transmit a short message comprising control information with a constant size.

Advantageous Effects

As described above, the present invention provides an effect to prevent the waste of the transmission power by enabling the terminal operating in the FDD mode to accurately measure the channel quality of the transmission channel through which it transmits the random access channel, and perform the random access procedure only if the channel status is good, thereby preventing the waste of the transmission power of the terminal.

In addition, the present invention provides an effect to improve the coverage of the random access channel of the terminal by enabling the terminal to determine whether or not to transmit the random access channel according to channel status when the terminal is located far from the base station such as the disaster.

MODE FOR CARRYING OUT THE INVENTION

Figure 1:
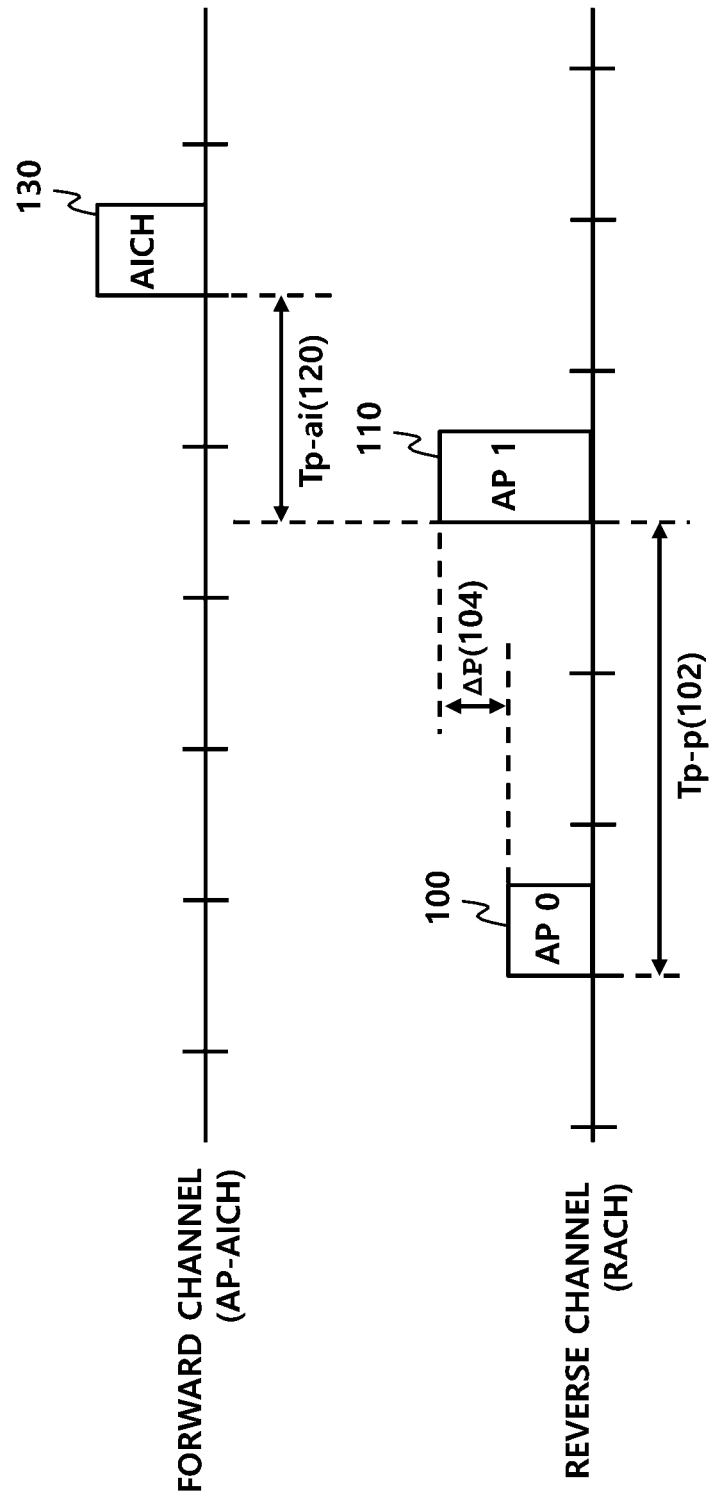
FIG. 1 is a diagram illustrating a signal transmission structure of an uplink RACH in a wireless communication system.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In the present specifications, a machine type communication (MTC) terminal refers to a low cost or low complexity terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined third generation partnership project (3GPP) Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a mega cell, a macro cell, a micro cell, a pico cell, a femto cell, and a small cell in association with a wireless area; or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an radio remote head (RRH), an antenna, an radio unit (RU), a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a mega cell, a macro cell, a micro cell, a pico cell, a femto cell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPD-CCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In the present specification, the term 'terminal' may refer to a remote station or a base station. Hereinafter, the term 'base station' may be used to represent a node transmitting a signal through a forward link (downlink), and the term 'terminal' may be used to represent a node transmitting a signal through a reverse link (uplink). In addition, a downlink channel and an uplink channel described below may refer to the frequency band of each link channel. That is, the frequency band at which the base station transmits a signal or a message to the terminal in the FDD mode may be referred to as one of the downlink, the downlink channel and the frequency band of the downlink channel. Likewise, the frequency band at which the terminal transmits a signal or a message to the base station in the FDD mode may be referred to as one of the uplink, the uplink channel and the frequency band of the uplink channel.

The present invention relates to the random access channel transmission technology in a wireless communication system and is applicable to all of the wireless communication system and the communication terminal of frequency division duplex (FDD). The present invention is widely applicable to the wireless communication system using the frequency division duplex. The present invention may preferentially reduce the transmitting power required for a reverse random access channel in a mobile communication field. The present invention may be used to expand a coverage radius for the terminal having the same maximum transmission power or limited to the average transmission power. The present invention may be applicable to all of the communication system and the terminal required for minimizing the used electric power such as a sensor network, a wireless LAN, a machine-to-machine communication, a machine type communication (MTC) and a communication system between medical equipments.

In particular, it may be useful for the emergency communication receiving a lot of attention recently. The terminal is often unable to communicate with the base station in the disaster because of the limited transmission power of the terminal. When this terminal is limited to its transmission power, it is possible to communicate with the base station by transmitting the random access channel in a good situation of its status in spite of the situation being not possible to communicate with the base station with the prior art.

The present invention may be applied in various wireless communication system such as the W-CDMA, the LTE, the LTE-A of the 3GPP or the cdma2000 of 3GPP2. Hereinafter, although a description is made of each of the wireless communication system of the W-CDMA and the LTE systems described above, it may be equally applied even in the case of cdma2000.

FIG. 1 is a diagram illustrating a signal transmission structure of an uplink RACH in a wireless communication system.

Figure 2:
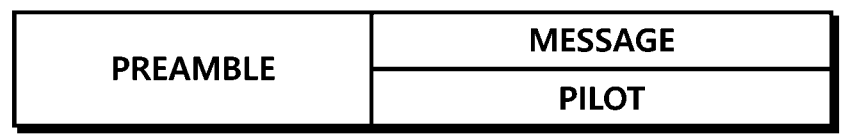
FIG. 2 is a diagram illustrating a structure of an access probe (AP).

FIG. 1 illustrates the transmission of the random access channel based on the W-CDMA system as an example of the wireless communication system. The terminal transmits a signal through a random access channel as shown in FIG. 1. FIG. 2 is a diagram illustrating a structure of an access probe (AP).

Referring to FIG. 1, assume that a forward channel (downlink channel) is an access preamble-acquisition indication channel (AP-AICH) 130, and a reverse channel (uplink channel) is a random access channel (RACH). As shown in the drawing, the terminal transmits a preamble through the random access channel of a reverse link (uplink) for initial synchronization of communication. In this instance, the terminal transmits an access probe (AP) AP0 100 including a preamble through the random access channel. For example, the terminal transmits the access probe consisting of a preamble as shown in (A) of FIG. 2 through the random access channel.

In case the terminal does not receive a response signal to the access probe AP0 100 from the base station for a time period of Tp-p 102, the terminal re-transmits, through the random access channel, an AP1 110 with an increased transmission power by $\Delta P$ 104 in comparison to the access probe AP0 100. In this instance, the access probe AP1 110 includes a preamble consisting of the same signature as the access probe AP0 100 transmitted previously.

Then, when the base station receives the access probe AP1 110 through the random access channel, the base station stands by for a time period of Tp-ai 120 and transmits a same signature as the received access probe AP1 110 to the terminal through an AICH 130. Then, the terminal identifies the signature and an acquisition indicator (AI) (not shown) by demodulating a signal received through the AICH 130. In case an acknowledgement (ACK) signal of the base station is identified through the acquisition indicator, the terminal stands for the time period of Tp-mag and transmits a message including reverse data (uplink data) to the base station through the reverse (uplink) random access channel. For example, the terminal transmits an access probe including a message configured as shown in (B) of FIG. 2 through the random access channel. In this instance, the terminal transmits the corresponding access probe with a transmission power corresponding to the access probe AP1 110.

In case the access probe including a message shown in (B) of FIG. 2 is transmitted from the terminal and is successively received by the base station, the 3GPP2 CDMA2000 random access channel provides a reception notification to the terminal through a forward (downlink) common channel. That is, this signal is transmitted as a message via the forward (downlink) common channel without AICH transmission.

In the case of the LTE or the LTE-A of the 3GPP, the terminal transmits the random access channel to the base station through the uplink channel, and the base station receives it from the terminal and then transmits a random access response thereof to the terminal through the downlink channel.

Hereinafter, the reverse link as described above refers to as the downlink through which the base station transmits signals or a data to the terminal to encompass each of the wireless communication system. In addition, the forward link refers to the uplink through the terminal transmits signals and data to the base station.

As described above, a majority of random access channels are an essential element of the wireless communication system, and the random access channel is implemented through various methods.

Despite various implementation methods, a conventional random access channel merely has transmitted an access probe immediately upon occurrence of an event that aims to transmit the random access channel on an high layer, without considering a channel status of the uplink channel. However, this prompt random access channel transmission has a problem that excessive transmission power is required.

To solve this problem, a method may be proposed in which the wireless communication system obtains information of the downlink channel status by measuring a status of the downlink channel, and transmits the random access channel only when the obtained information satisfies a particular transmission condition. By determining whether to transmit the random access channel based on the channel status and delaying the transmission of the random access channel access probe when the transmission condition is not satisfied, a transmission output may be significantly reduced. Also, a coverage radius of the terminal may be greatly expanded under the same maximum or average transmission output condition. To determine whether or not to transmit the random access channel depending on the channel conditions may be referred to as an adaptive random access channel transmission In sum, the above-mentioned channel adaptive random access channel transmission scheme enabled a terminal to determine a random access channel transmission condition in advance, to measure the downlink channel, and when the downlink channel satisfies a transmission condition, to transmit the random access channel, and otherwise, to delay the transmission of the random access channel. That is, a transmission power used in transmission may be significantly reduced by transmitting the random access channel only when a channel status is good.

However, in the case of such a channel adaptive random access channel, the terminal measures the channel quality of the downlink channel but there has a problem that the random access channel is transmitted through the uplink channel. That is, there may be a difference between the measured quality of the downlink channel and the real quality of the uplink channel through which the terminal transmits the random access channel in the FDD mode of which frequency bands of the downlink channel and the uplink channel are separated from each other. Thus, although the terminal operating in FDD mode performs the above-mentioned channel adaptive random access channel transmission scheme, the effect of preventing a waste of transmission power and increasing the coverage radius may not occur depending on the situation. Hereinafter, an embodiment according to the present invention may provide a method and an apparatus that may achieve the effect of the above-mentioned channel adaptive random access channel transmission scheme in the FDD mode.

Hereinafter, embodiments of the present invention will be described in detail with reference to the accompanying drawings. In the following description of the present invention, a detailed description of known functions and configurations incorporated herein will be omitted when it may make the subject matter of the present invention rather unclear. The following terms are defined in consideration of the functions of the present invention, and this may be changed according to the intention of the user, the operator, or the like. Therefore, the definition should be based on the contents throughout this specification.

In the present invention, the terminal identifies the quality of the transmission channel to transmit the random access channel based on the reference signal transmitted by the base station. Generally, in the number of the wireless communication system, the base station continuously or periodically transmits a pilot or a reference signal through the downlink. However, any channel transmitted by the base station in addition to reference signals may be used to measure the status of the channel.

In other words, in this specification, the signal for measuring the channel status is described as the reference signal as one example for the convenience of understanding, but various signals transmitted by the base station such as a control signal of the short message may be used for measuring the channel status Therefore, the signal or the message of any type that can measure the channel status may be included in the reference signal of the present invention.

Figure 3:
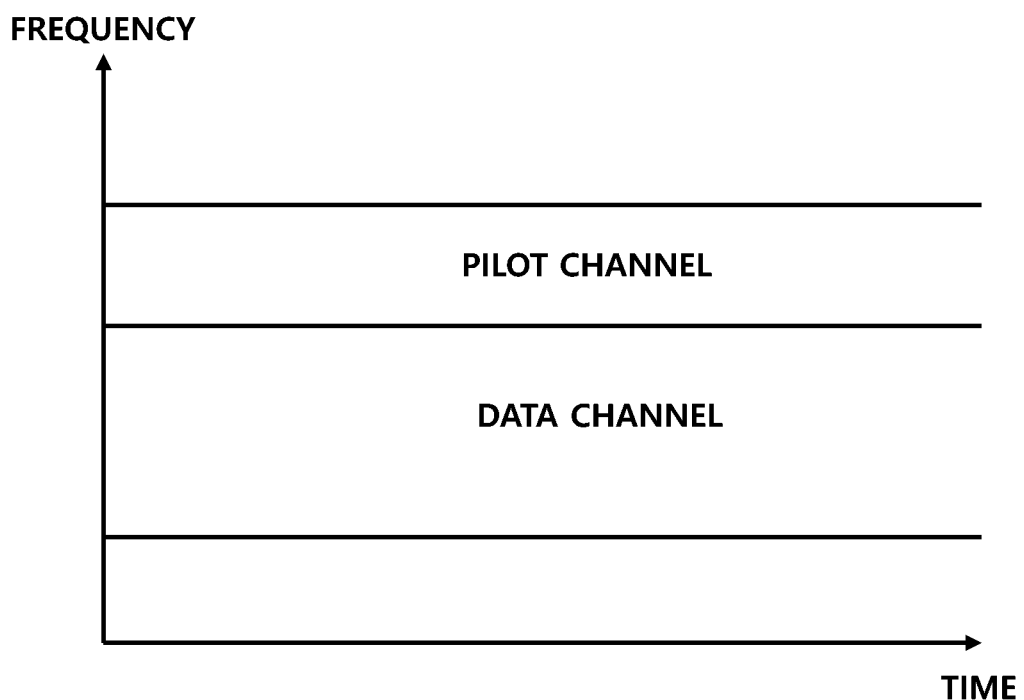
FIG. 3 is a diagram illustrating a pilot channel transmitted in the cdma2000 system or the W-CDMA system.

FIG. 3 is a diagram illustrating a pilot channel transmitted in the cdma2000 system or the W-CDMA system.

Referring to FIG. 3, in case a pilot channel exists as one code channel, the pilot channel is always transmitted continuously. Accordingly, the terminal may measure a status of a downlink channel by measuring the pilot channel. As described previously, when transmitting the random access channel, a conventional CDMA2000 or W-CDMA system transmitted the random access channel immediately upon occurrence of an event of triggering the random access channel on the high layer. In this instance, to determine a transmission power for transmitting the random access channel, a status of a downlink channel was measured. That is, the pilot channel being transmitted via the downlink channel was continuously measured and used to determine the transmission power of the random access channel.

Figure 4:
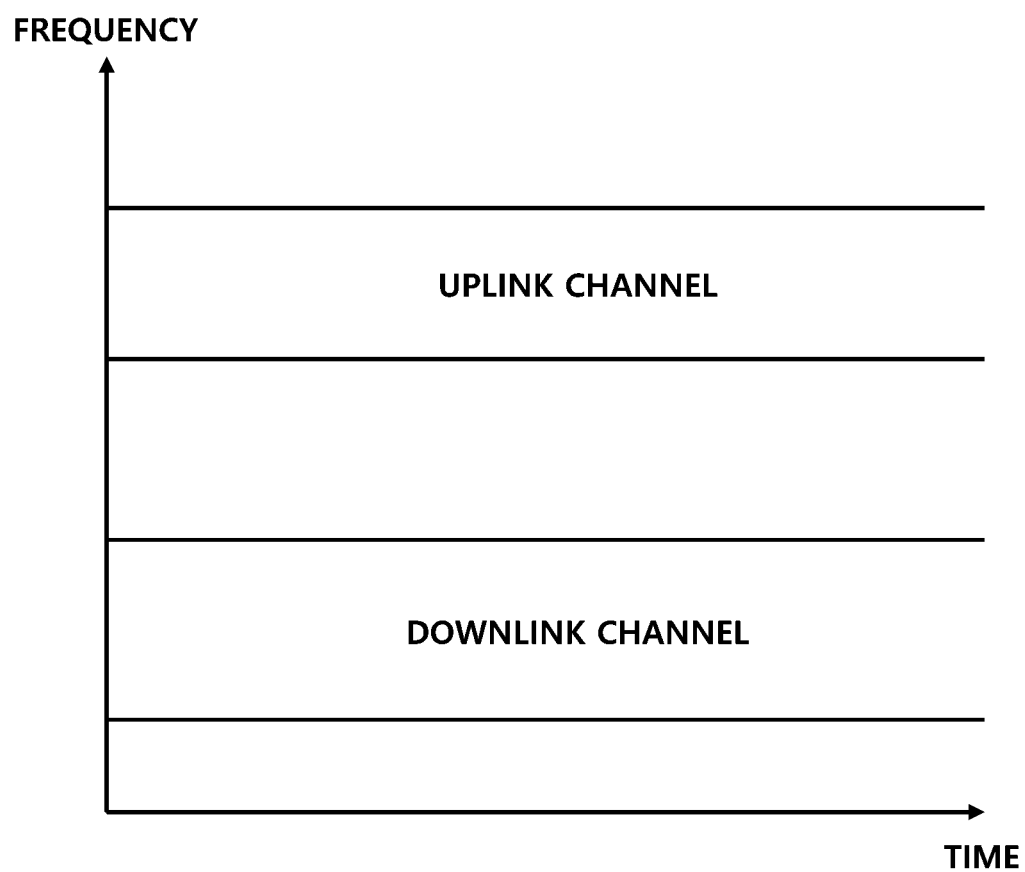
FIG. 4 is a diagram illustrating an uplink channel and a downlink channel in the LTE system.

FIG. 4 is a diagram illustrating an uplink channel and a downlink channel in the LTE system.

Referring to FIG. 4, the FDD mode of the LTE or the LTE-A systems is physically divided into the uplink and downlink channels according to the frequency band. In this case, the uplink and the downlink channels are configured for other uses. In conventional LTE or LTE-A systems, the terminal transmitted the random access channel to the base station through the uplink channel. In addition, the base station transmitted the random access response in response to the random access channel through the downlink channel to the terminal. That is, the FDD communication system is configured to be both the downlink channel through which the base station may transmit a signal and a message to the terminal and the uplink channel through which the terminal may transmit a signal and a message to the base station. The uplink and the downlink are separated from each other by a spacing of relatively large frequencies so that channel reciprocity may be applied well.

As described previously, Conventional random access channel transmission scheme transmitted the random access channel immediately upon occurrence of an event of triggering the random access channel on the high layer. However, the present invention provides the method and the apparatus to enable the terminal to transmit the random access channel only if the channel satisfies the predetermined condition and otherwise, to delay the transmission of the access probe. The coverage radius of the terminal limited to the maximum transmission power may be greatly expanded by transmitting the random access channel only when the channel status is very good. This can be very useful in situations where there needs to communicate with the external such as the disasters.

The present invention provides the method and the apparatus to transmit the channel adaptive random access channel in the communication system of the FDD scheme. It measures the channel quality through the channel where the reference signal is transmitted and transmits the random access channel through the same frequency band so that the channel reciprocity may be applied. In addition, any channel transmitted by the base station in addition to reference signals may be used to measure the status of the channel.

Figure 5:
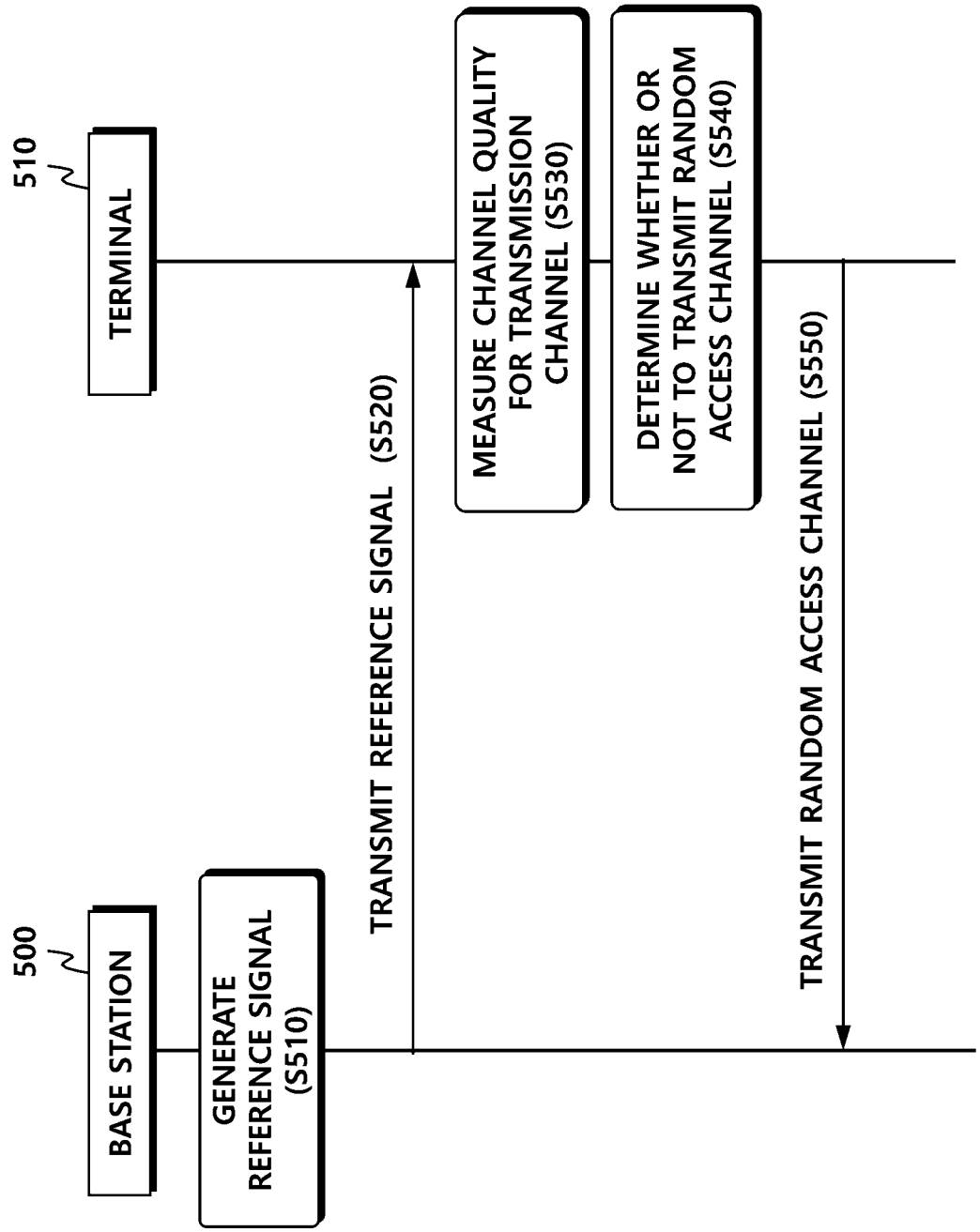
FIG. 5 is a diagram illustrating an operation of a terminal and a base station according to an embodiment of the present invention.

FIG. 5 is a diagram illustrating an operation of a terminal and a base station according to an embodiment of the present invention.

In accordance with an embodiment of the present invention, there is provided a method for transmitting a random access channel by a terminal in the FDD mode. The method comprises receiving, through a transmission channel, a signal for measuring the quality of a transmission channel to transmits a random access channel; measuring the quality of the transmission channel using the signal, and determining whether or not to transmit the random access channel; and transmitting the random access channel through the transmission channel. It may transmit a reference signal as the signal for measuring the quality of the transmission channel. It may transmit a short message comprising the control information with a constant size.

In accordance with another embodiment of the present invention, there is provided a method for receiving a random access channel by a base station in the FDD mode. The method comprises: generating a signal for measuring the quality of a transmission channel at which a terminal transmits a random access channel through the transmission channel; transmitting the signal through the transmission channel; and receiving the random access channel through the transmission channel. It may transmit the reference as the signal. It may transmit a short message comprising the control information along with the reference signal.

Referring to FIG. 5, the base station 500 generates the reference signal to be transmitted to the terminal 500 at S510. The reference signal means a signal for measuring the quality of the channel through which the terminal receives it. For example, there may be the signal such as a CRS or a CSI-RS in the LTE system. In addition, it may include all the signals that are used to measure the channel quality at each communication system.

The base station 500 may transmit the generated reference signal to the terminal 501 through the transmission channel for transmitting a random access channel at S520. That is, the base station 500 transmits the reference signal to the terminal 501 through the transmission channel where the random access channel will be transmitted so that it may satisfy the above-described channel reciprocity.

The terminal 501 may measure the quality of the transmission channel using the received reference signal at S530. Specifically, the channel quality may be measured by using the RSRP (Reference Signal Received Power) or the RSRQ (Reference Signal Received Quality) of the reference signal and it can be used for channel quality measurement procedure in each wireless communication system. When an event for the transmission of the random access channel has occurred on the high layer, the terminal 501 may determine whether or not to transmit the random access channel based on measurement results of the measured channel quality at S540. That is, the terminal 501 may determine that the transmission of the random access channel is transmittable in case the measured quality of the transmission channel is more than the predetermined reference value and the event for the transmission of the random access channel has occurred. If the result of the channel quality does not reach the reference value despite an event for the transmission of the random access channel has occurred, the terminal 501 may determine that the transmission of the random access channel is not transmittable and may delay the transmission. After the channel quality is also measured using the next reference signal, the reference signal may be delayed until the reference signal exceeds the reference value.

If the transmission of the random access channel is determined in at S540, the terminal 501 can transmit the random access channel through the transmission channel through which the reference signal is received.

The above-described transmission channel of the present invention may be either the downlink channel or the uplink channel according to each embodiment described below.

Figure 6:
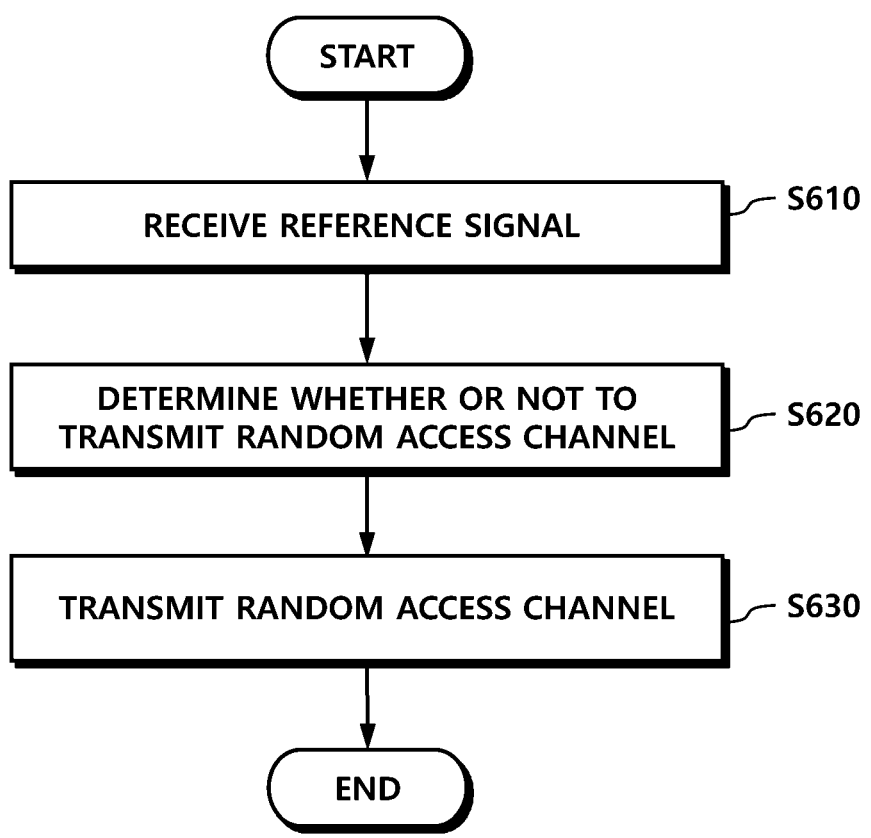
FIG. 6 is a flowchart illustrating an operation of the terminal according to the embodiment of the present invention.

FIG. 6 is a flowchart illustrating an operation of the terminal according to the embodiment of the present invention.

Referring to FIG. 6, in a method for transmitting the random access channel in the FDD mode, the terminal receives the reference signal for measuring the quality of the transmission channel for transmitting the random access channel through the transmission channel at S610. For example, the terminal receives the reference signal for measuring the quality of the transmission channel through the transmission channel. Here, the transmission channel means a channel for transmitting the random access channel to the base station. Therefore, the terminal may transmit the random access channel using the same frequency band as the frequency band in which the reference signal is received. As a result, it is possible to satisfy the channel reciprocity described above, and as the channel reciprocity is satisfied, it is possible to transmit the random access channel only in a specific condition, thereby preventing the waste of the transmission power and increasing the communication distance.

In addition, the terminal measures the quality of the transmission channel using the reference signal and determines whether or not to transmit the random access channel at S620. For example, the step of determining whether or not to transmit the random access channel may trigger the transmission of the random access channel when the quality of the transmission channel is more than the reference value and the event for the transmission of the random access channel has occurred. That is, based on the event for the transmission of the random access channel and the measurement result of the transmission channel quality, it is possible to determine whether to transmit the random access channel or delay the transmission.

In addition, the terminal may transmit the random access channel through the transmission channel at S630. For example, the transmission channel through which the random access channel is transmitted is the same as the transmission channel through which the reference signal is received in at S610. Therefore, the terminal may transmit the random access channel based on the accurate channel quality of the transmission channel capable of transmitting the random access channel.

In addition, the terminal may further set the random access channel transmission mode (not shown). before the step of S610. In the step of setting the transmission mode, the transmission modes are set differently so that the embodiments of the present invention described below can be applied. For example, the random access channel transmission mode may be divided into a normal mode in which the reference signal is received through the downlink channel and the random access channel is transmitted through the uplink channel and a disaster mode in which the random access channel and the reference signal are transmitted and received through one of the downlink channel or uplink channel. The normal mode means that the transmission and reception of the reference signal and the random access channel are performed in different frequency bands as in the conventional random access channel transmission. The disaster mode means that the frequency band in which the reference signal and the random access channel are transmitted is the same. The terminal can distinguish the normal mode from the disaster mode and change the mode according to the status of the terminal or the satisfaction of the preset mode reference information. The terminal may receive mode setting information from the base station and change its mode. For example, when a disaster occurs, the base station broadcasts information indicating a change to the disaster mode through a broadcast channel, and the terminal can set a mode to the disaster mode when receiving the information. Alternatively, the normal mode and the disaster mode may be periodically changed at a predetermined cycle. In this case, the base station can periodically change the normal mode and the disaster mode at the same period.

Hereinafter, the case where the transmission channel is the downlink channel and the case where the transmission channel is the uplink channel will be described with reference to the drawings.

The First Embodiment

Figure 7:
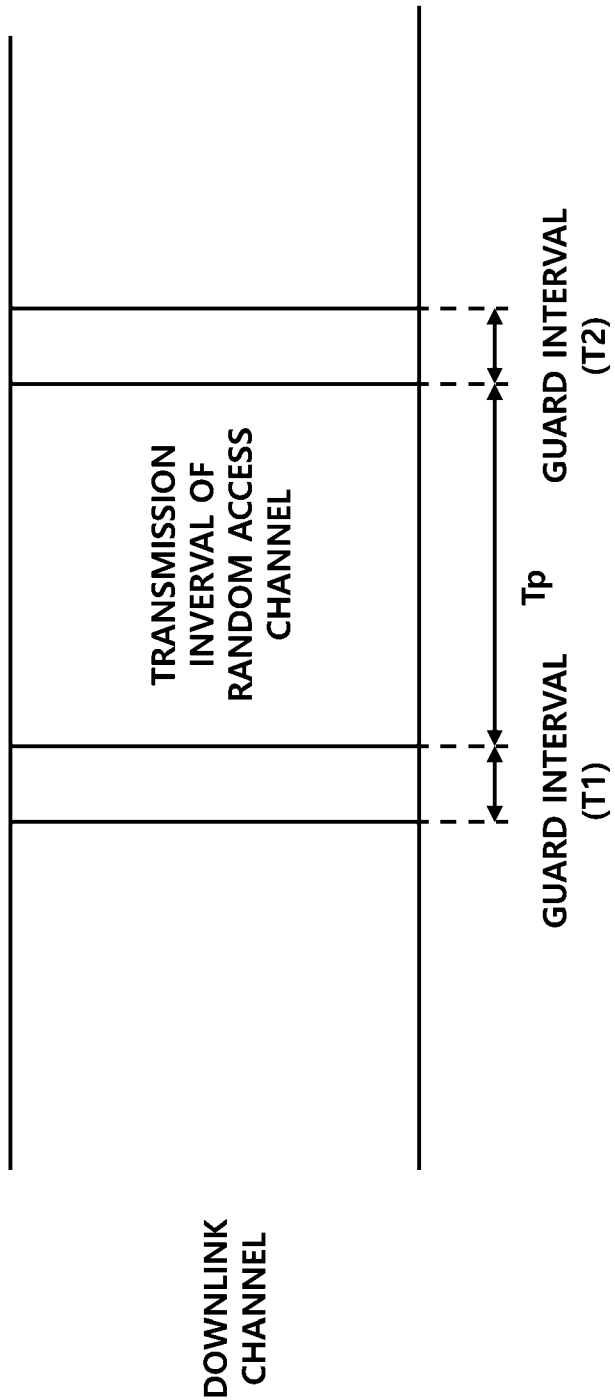
FIG. 7 is a diagram illustrating the transmission of a random access channel in the downlink channel according to the other embodiment of the present invention.

FIG. 7 is a diagram illustrating the transmission of a random access channel in the downlink channel according to the other embodiment of the present invention.

The terminal according to the other embodiment of the present invention for transmitting a random access channel in the FDD mode may receive, through a transmission channel, a signal for measuring the quality of a transmission channel to transmits a random access channel; measure the quality of the transmission channel using the signal, and determine whether or not to transmit the random access channel; and transmit the random access channel through the transmission channel. The transmission channel may be the uplink channel. The transmission channel may be the downlink channel. It may transmit a reference signal as the signal for measuring the quality of the transmission channel. It may transmit a short message comprising the control information with a constant size.

Referring to FIG. 7, the terminal receives the reference signal through the downlink. The base station interrupts the transmission of signals and data through the downlink in a predetermined period (T1+Tp+T2) and enables the terminal to transmit the random access channel. That is, the terminal of the wireless communication system may receive the reference signal through the downlink channel and transmit the random access channel in the interval Tp in which the downlink signal and data are temporarily interrupted. The interval in which the base station does not transmit signals is the interval of T1+Tp+T2, where Tp is the interval over which the terminal can transmit the access probe, and T1 and T2 are the guard times between the access probes. The terminal can transmit the random access channel during the Tp interval. Meanwhile, it is necessary to measure the quality of the downlink channel for channel adaptive random access channel transmission. To this end, the terminal measures the channel status of the downlink before a point of time when the transmission of the random access channel is possible.

Meanwhile, the terminal may further receive system information including a transmission parameter for the transmission of the random access channel. The transmission parameter may include at least one of transmission interval information, transmission resource information, and transmission interval information to transmit the random access channel in the downlink channel. The transmission interval is an interval for transmitting the random access channel in the downlink channel, and not transmitting the downlink data in the downlink channel.

For the present invention, the terminal should know when a transmission interval for transmitting the random access channel in a downlink channel is. To this end, the base station transmits the transmission parameter to the terminal through signaling. As shown in FIG. 7, when it may permits a time when the terminal instantaneously transmits the random access channel in the downlink channel, the transmission parameter information must be shared between the base station and the terminal. The transmission parameter may include whether the base station permits the terminal to instantaneously transmit the random access channel in the downlink channel, the length of the Tp interval in which the random access channel can be transmitted in the downlink, the period and the position thereof, etc. The base station may transmit the transmission parameter as the system information to the terminals through the broadcasting channel.

As another example, in the case of W-CDMA, a terminal uses a downlink pilot channel to measure the downlink channel. For the performance of the random access channel, the measurement of the downlink channel needs to be accurate. In order to measure a more accurate downlink channel, the transmission power of the pilot channel may be increased and transmitted just before the random access channel transmission time. The terminal may receive the reference signal of enhanced transmission power through the pilot channel and measure a more accurate channel quality.

Specifically, the base station immediately increases the power of the pilot channel for a predetermined time interval (Tm) before the T1 interval in FIG. 7 for the transmission of the random access channel in the downlink channel. At that moment, the power of the pilot channel is increased by a predetermined amount AP and transmitted. The time interval and the amount of AP may be transmitted in advance to the terminals as the system information through the broadcasting channel as well as other parameters. Thereafter, the terminals do not transmit signals and data through the downlink channel in order to transmit the random access channel in the Tp interval. The terminal uses a pilot channel with increased power for Tm time for downlink channel measurement. It is possible to measure the status of the downlink channel more accurately by utilizing the pilot channel of the increased power. Based on the measured downlink channel status, it is determined whether the random access channel is transmitted. If the terminal determines to transmit the random access channel, it transmits the random access channel during the next Tp interval.

The Second Embodiment

Figure 8:
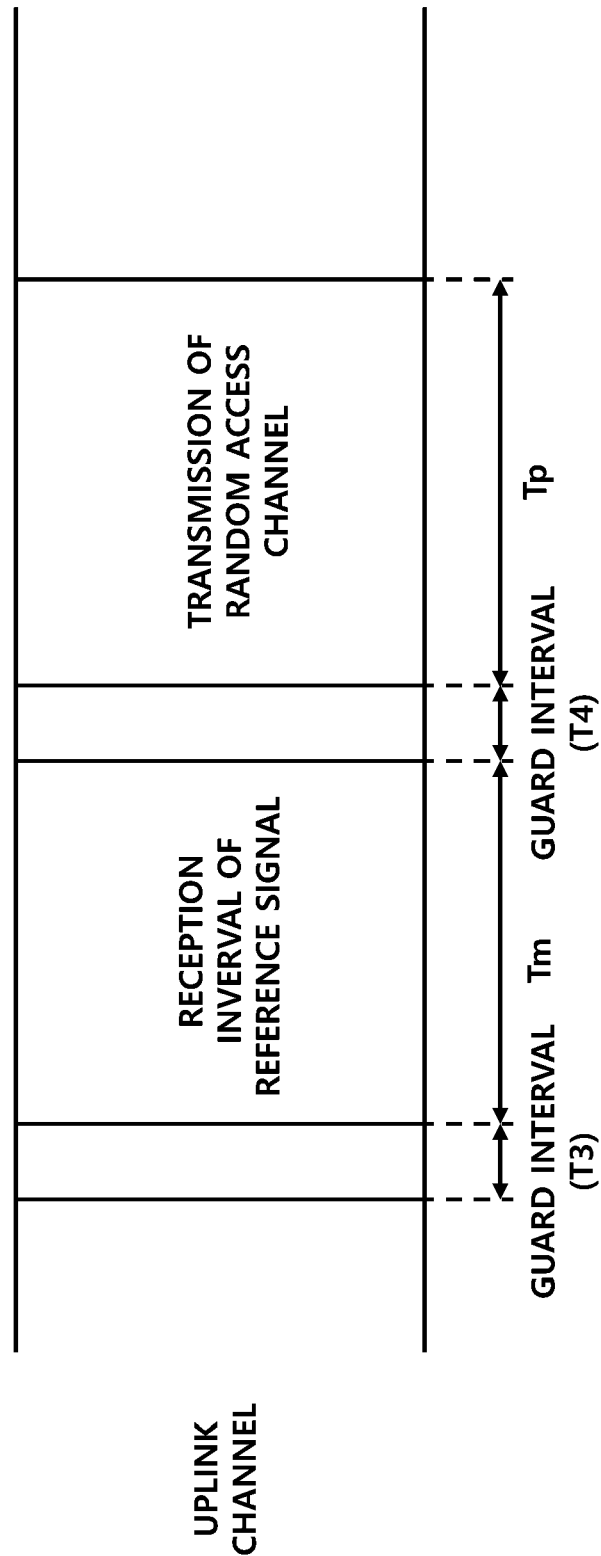
FIG. 8 is a diagram illustrating the transmission of the random access channel in the uplink channel according to another embodiment of the present invention.

FIG. 8 is a diagram illustrating the transmission of the random access channel in the uplink channel according to another embodiment of the present invention.

The terminal according to another embodiment of the present invention for transmitting a random access channel in the FDD mode may receive, through a transmission channel, a signal for measuring the quality of a transmission channel to transmits a random access channel; measure the quality of the transmission channel using the signal, and determine whether or not to transmit the random access channel; and transmit the random access channel through the transmission channel. The transmission channel may be the uplink channel. It may transmit a reference signal as the signal for measuring the quality of the transmission channel. It may transmit a short message comprising the control information with a constant size.

It is proposed that the base station transmits the reference signal through a part of the frequency band used as the uplink through which a terminal transmits a signal to the base station. The uplink channel is generally used for transmitting signals or data transmitted by the terminals to the base station. In this embodiment, for transmission of the channel adaptive random access channel, the base station transmits the reference signal through the frequency band of the uplink channel for a certain time interval in order to measure the channel.

Referring to FIG. 8, the terminals transmit signals or data to the base station through the uplink, and stop the transmission of the uplink during the time interval T3+Tm+T4. During this interval, the base station transmits the reference signal for channel measurement to the terminal in a time interval of Tm. At this time, the transmitted signal is the reference signal (the pilot channel in case of W-CDMA), and the transmitted channel is spread using the downlink spreading code corresponding to the uplink.

The terminal measures the status of the transmission channel using the reference signal transmitted during the Tm time interval. And the terminal may determine whether to transmit the channel adaptive random access channel based on the measured channel status. If the measured channel status of the transmission channel is greater than or equal to the predetermined reference value, the terminal transmits the channel adaptive random access channel, and, otherwise, not transmits it. At this time, the channel adaptive random access channel may be transmitted during the Tp time interval. That is, the terminal may measure the channel quality according to the frequency band of the uplink channel receiving the reference signal, and may also transmit the random access channel to the base station through the uplink channel.

As another example, it is possible to restrict all or some of the other terminals from using the uplink channel in the Tp interval in which the channel adaptive random access channel is transmitted. When there restricts the signal transmission of all the terminals except for the terminal transmitting the channel adaptive random access channel in the Tp interval, the terminal transmitting the channel adaptive random access channel does not transmit the uplink in the interval T3+Tm+T4 while the other terminals do not transmit the uplink in the Tp interval thereafter.

In a case where the base station transmits the reference signal for the random access channel in the uplink channel, this information needs to be shared between the base station and the terminal. Accordingly, the terminal of the present invention may further receive system information including the reference signal parameter for receiving the reference signal. Herein, the reference signal parameter may include at least one of reception interval information on which the reference signal is received in the uplink channel, reception resource information, and period information of the reception interval. That is, the terminal may receive whether or not to use the uplink for instantaneous reception of the reference signal, the length of the Tm interval in which the base station transmits the reference signal through the uplink, the period and the position thereof, etc as the system information from the base station through the broadcasting channel. Also, information on whether or not another user can use the uplink in the period Tp may be included in the reference signal parameter. The above-mentioned reception interval may refer to a period during which the terminal receives the reference signal in the uplink channel and the uplink data is not transmitted.

As described above, the terminal of the present invention may measure the channel quality using the frequency band of the uplink channel or the frequency band of the downlink channel for the transmission of the channel adaptive random access channel transmission and transmit the random access channel.

According to the present invention, an access probe of the random access channel is transmitted only when a predetermined channel condition is satisfied, unlike the conventional method in which the random access channel is transmitted immediately when a conventional high layer event has occurred. Otherwise, the transmission of the access probe is delayed. In this case, since the random access channel is transmitted only to a very good channel, the random access channel and the short message can be transmitted to the base station even in the case where normal transmission is impossible. This can be useful when emergency calls must be successful, such as during the disaster. In this case, unlike the general case, it is also possible to transmit the random access channel of the present invention only to a good channel environment of the upper 1% level.

In the present invention, there is proposed the method of allowing the base station to transmit the reference signal in a part of the uplink is proposed. In addition, there is proposed the method in which a terminal may transmit the random access channel in a certain part of the downlink.

These methods may be used in general cases, but they may be more effective in emergency situations such as disaster situations. Accordingly, it is possible to notify information on whether the system operates in this mode to the terminals in advance through broadcasting. In addition to whether the system operates in this mode, related parameters may also be broadcasted and shared. The terminal may apply the random access channel method of the present invention described above at the time of a specific condition or of occurrence a specific event based on the broadcasted information.

Figure 9:
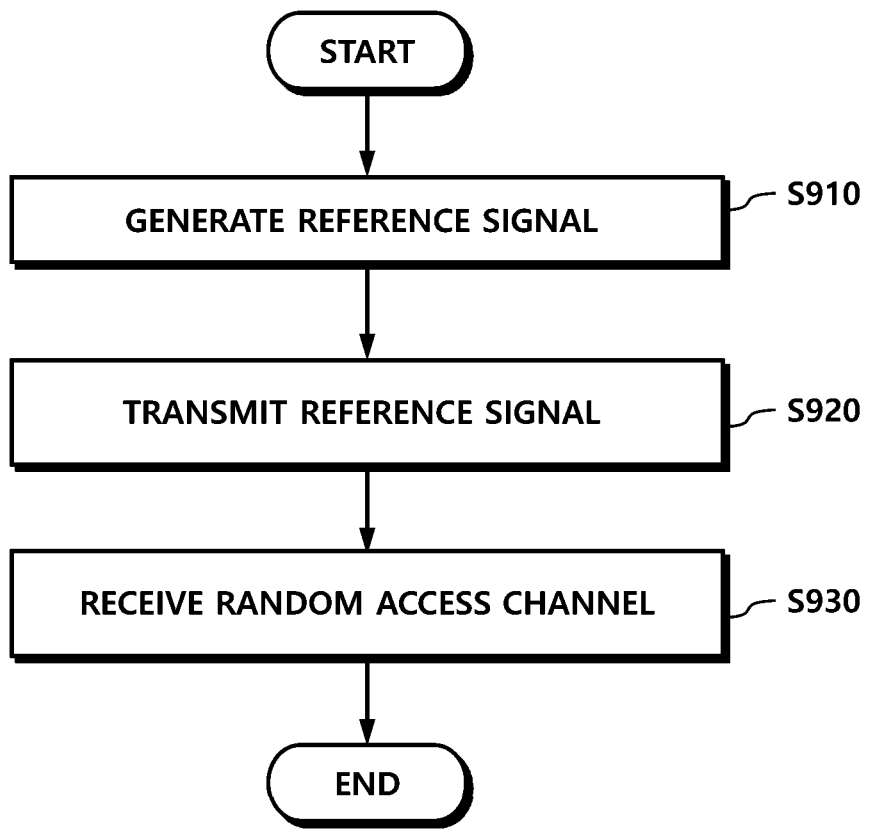
FIG. 9 is a flowchart illustrating an operation of the base station according to further another embodiment of the present invention.

FIG. 9 is a flowchart illustrating an operation of the base station according to further another embodiment of the present invention.

The base station according to yet another embodiment of the present invention for receiving a random access channel in the FDD (Frequency Division Duplex) mode may generate the reference signal for measuring the quality of a transmission channel at which the terminal transmits the random access channel through the transmission channel, transmit the reference signal through the transmission channel and receive the random access channel through the transmission channel.

Referring to FIG. 9, the base station may generate the reference signal for measuring the quality of a transmission channel through which the terminal transmits the random access channel at S910. The reference signal is a signal for the terminal to measure the channel quality of the transmission channel. In addition, the channel quality may be measured through a channel quality algorithm such as the RSRP or the RSRQ.

The base station may further transmit the reference signal through the transmission channel at S920. Thereafter, the base station may receive the random access channel from the terminal through the transmission channel at S930.

As an example, the transmission channel may be the downlink, as described above, with respect to the terminal. That is, the transmission channel may mean the frequency band of the downlink channel. In this case, the base station may further transmit the system information including transmission parameters for the transmission of the random access channel. The transmission parameter may include at least one of transmission interval information, transmission resource information, and transmission interval information to transmit the random access channel in the downlink channel. The transmission interval is an interval for transmitting the random access channel in the downlink channel, and not transmitting the downlink data in the downlink channel.

As another example, the transmission channel may be the uplink. That is, the transmission channel may mean the frequency band of the uplink channel. In this case, the base station may further transmit the system information including the reference signal parameter for transmitting the reference signal. The reference signal parameter may include information on at least one of reception interval information, reception resource information, and reception interval information of the terminal in the uplink channel. The above-mentioned reception interval may refer to a period during which the terminal receives the reference signal in the uplink channel and the uplink data is not transmitted.

In addition, the base station may perform all the operations of the base station related to the random access channel reception and the reference signal transmission of the present invention described above with reference to FIG. 1 to FIG. 8.

As described above, the present invention proposes a method for enabling the channel adaptive random access channel to be operated in the FDD mode. In this method, when the maximum transmission power of the terminal is limited, the coverage radius can be greatly expanded and the transmission power can be greatly reduced. That is, the channel adaptive random access channel may identify the channel status of the transmission channel and determine whether to transmit the random access channel based on the channel status. By transmitting the random access channel only when the predetermined channel condition is satisfied, the transmission power consumed in the random access channel can be reduced and the coverage radius may be increased with the same transmission power.

Hereinafter, the configuration of each of the terminal and the base station capable of performing all of the above-mentioned random access channel transmission/reception methods of the present invention will be briefly described with reference to the drawings.

Figure 10:
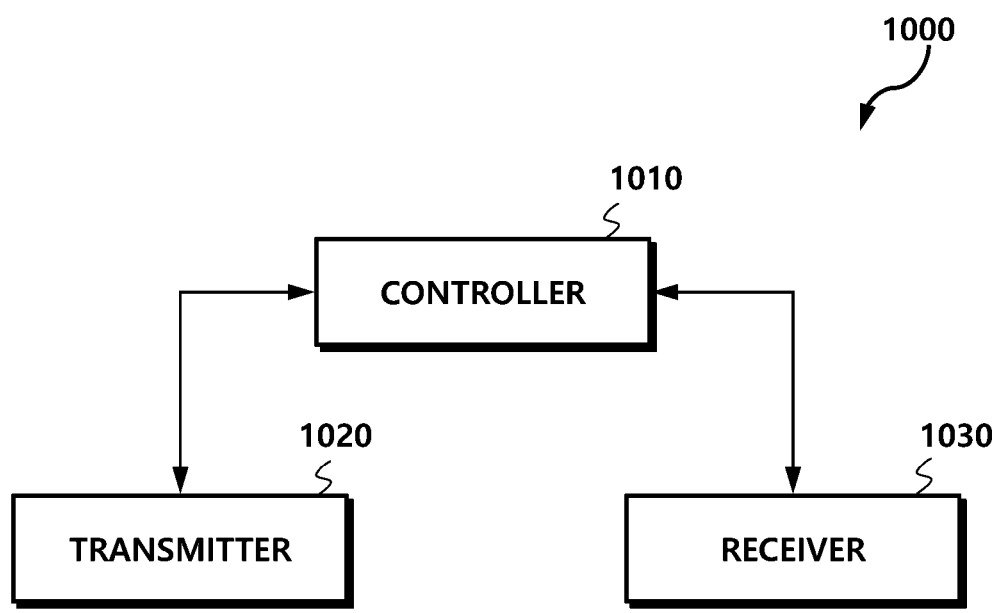
FIG. 10 is a diagram illustrating a configuration of the terminal as an example according to further another embodiment of the present invention.

FIG. 10 is a diagram illustrating a configuration of the terminal as an example according to further another embodiment of the present invention.

The terminal 1000 according to still another aspect of the present invention for transmitting a random access channel in the FDD mode comprises a receiver 1030 for receiving, through a transmission channel, a signal for measuring the quality of a transmission channel to transmits a random access channel; a controller for measuring the quality of the transmission channel using the signal, and determining whether or not to transmit the random access channel; and a transmitter for transmitting the random access channel through the transmission channel. It may receive the reference signal as the signal for measuring the quality of the transmission channel.

Referring to FIG. 10, the terminal 1000 includes the receiver 1030, the controller 1010 and the transmitter 1020.

The receiver 1030 receives control information, data, and messages from the base station through the corresponding channel. Further, the receiver 1030 may receive the above-described reference signal. The reference signal may be received through the transmission channel of the random access channel. That is, it may be received through the downlink channel or received through the uplink channel depending on each of the above-described embodiments. Also, the receiver 1030 may receive the transmission parameter through the broadcast channel. The transmission parameter may include at least one of transmission interval information, transmission resource information, and transmission interval information to transmit the random access channel in the downlink channel, as described above. In addition, the receiver 1030 may receive information on the transmission mode including information related to the normal mode or the disaster mode from the base station.

The controller 1010 controls the overall operation of the terminal according to control of the transmission of the channel adaptive random access channel necessary for performing the above-described present invention. In addition, the controller 1010 may measure the quality of the transmission channel using the reference signal and determine whether to transmit the random access channel. In addition, the controller 1010 may change and control the setting of the transmission mode.

The transmitter 1020 transmits control information, data, and a message to the base station through the corresponding channel. In addition, the transmitter 1020 may transmit the random access channel to the base station through the corresponding transmission channel. The transmission channel may be the downlink channel or the uplink channel and may be set differently according to each of the above-described embodiments.

Figure 11:
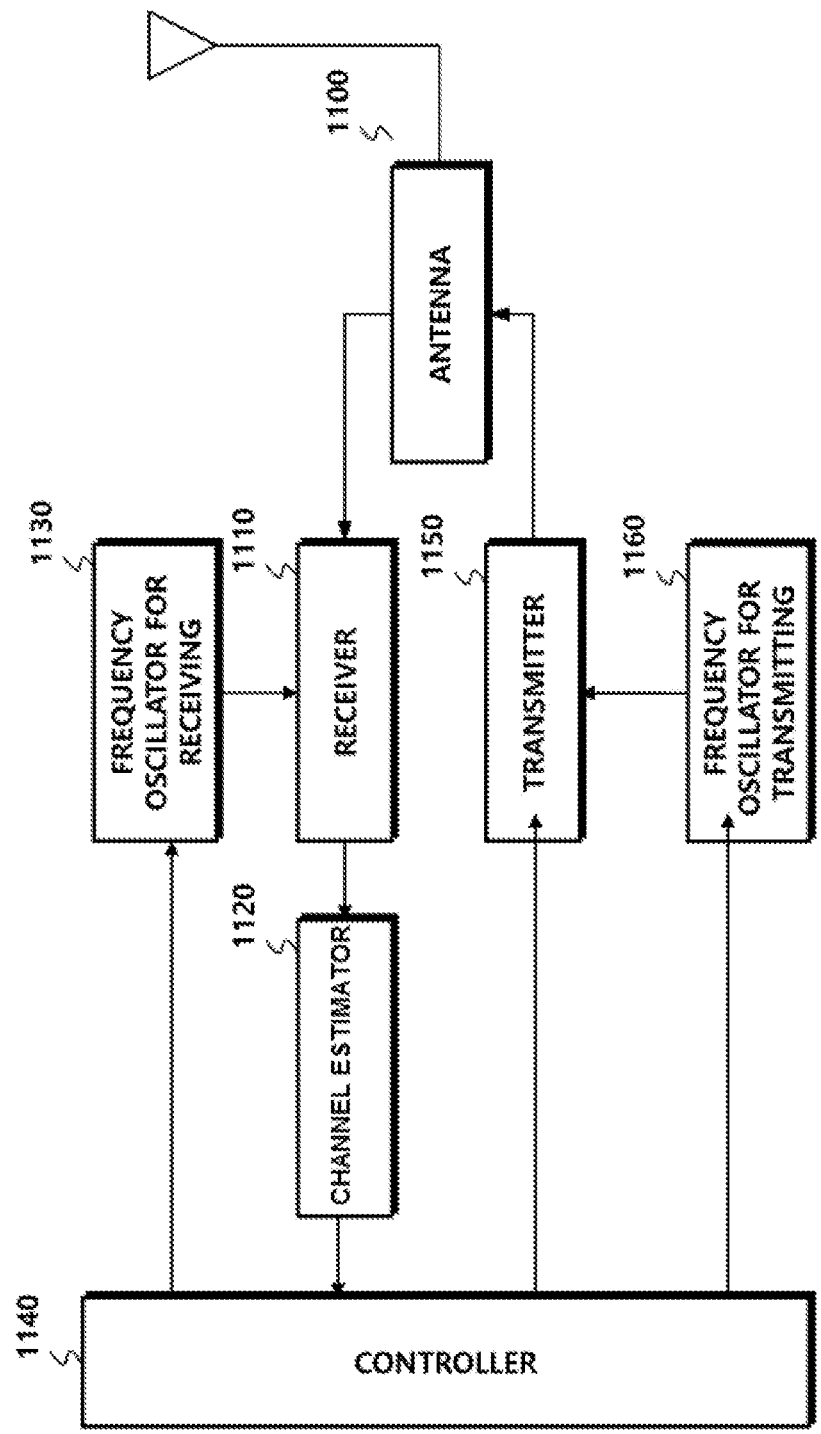
FIG. 11 is a diagram illustrating a configuration of the terminal as the other example according to further another embodiment of the present invention.

FIG. 11 is a diagram illustrating a configuration of the terminal as the other example according to further another embodiment of the present invention.

As shown in FIG. 11, the terminal may include an antenna 1100, a receiver 1110, a channel estimator 1120, a frequency oscillator for reception 1130, a controller 1140, a transmitter 1150, a frequency oscillator for transmission 1160. The antenna 1100 plays a role of receiving a signal transmitted through a wireless channel and transmitting a signal transmitted by the terminal.

The receiver 1110 recovers data from the signal received from the antenna 1100. For example, the receiver 1110 may comprise an RF receiving block, a demodulation block, a channel decoding block, and so on. The RF receiving block consists of a filter and an RF preprocessor. The channel decoding block is composed of a demodulator, a deinterleaver and a channel decoder.

The channel estimator 1120 estimates the transmission channel using the received signal provided from the receiver 1110. For example, the channel estimator 1120 estimates received power of the received signal using the pilot signal or the reference signal of the downlink signal. The frequency oscillator for receiving 1130 generates a frequency for receiving a signal at the receiver 1110. Generally, in the FDD mode, the reception frequency and the transmission frequency are set differently.

The controller 1140 determines whether to transmit the random access channel based on the status information of the transmission channel provided from the channel estimator 1120. That is, the controller 1140 compares the power of the received signal estimated by the channel estimator 1120 with the reference value and determines whether to transmit the random access channel. For example, if the power of the received reference signal estimated by the channel estimator 1120 is less than the reference value, the controller 1140 determines that the transmission channel status is not suitable for the transmission of the random access channel. Accordingly, the controller 1140 controls the transmitter 1150 so as not to transmit the random access channel. For example, if the power of the reference signal estimated by the channel estimator 1120 is more than the reference value, the controller 1140 determines that the transmission channel status is suitable for random access channel transmission. Accordingly, the controller 1140 controls the transmitter 1150 to transmit a random access channel. At this time, the controller 1140 may determine whether to transmit the random access channel using the reference value provided from the base station. In another example, the controller 1140 may calculate the reference value in consideration of a QoS (Quality of Service) of a service requested by the user.

In the present invention, the controller 1140 may control the terminal to measure the channel status of the transmission channel only for a predetermined time. That is, the controller 1140 determines a next measurement time of transmission channel status and performs the measurement of the transmission channel when the current time is the next measurement time. Otherwise, the controller 1140 turns off the power of the terminal until the next measurement time to minimize power consumption. In the next measurement time while the power of the terminal is off, the controller 1140 may operate the terminal again to measure the channel status of the transmission channel.

The transmitter 1150 generates a signal to be transmitted to the base station via the random access channel under the control of the controller 1140. That is, the transmitter 1150 converts the signal to be transmitted to the base station through the random access channel into a form for transmission through the radio resource only when the controller 1140 controls to perform the transmission of the random access channel, and provides the converted signal for the antenna 1100. For example, the transmitter 1150 includes a signal generation block, a channel code block, a modulation block, an RF transmission block, and the like. The channel coded block is composed of a modulator, an interleaver and a channel encoder. The RF transmission block consists of a filter and an RF preprocessor.

The frequency oscillator for transmitting 1160 oscillates at a transmission frequency required for signal transmission in the transmitter 1150 under the control of the controller 1140.

In the first embodiment of the present invention, the terminal can instantaneously transmit the random access channel in the downlink of the FDD mode by setting the frequency of the transmitter 1150 equal to the frequency of the receiver 1110. For this, the controller 1140 oscillates in accordance with the reception frequency of the downlink in the frequency of the frequency oscillator for transmitting 1160.

In the second embodiment, the terminal instantaneously receives the reference signal transmitted by the base station on the uplink of the FDD mode. For this, the controller 1140 oscillates the frequency of the frequency oscillator for receiving 1130 according to the transmission frequency of the uplink.

The configuration of the base station is similar to that of FIG. 11. However, the operation of the controller and the actually transmitted signal are different from those of FIG. 11. The operation of the base station will be described with reference to the structure of FIG. 11. In the first embodiment, the base station instantaneously sets the frequency of the receiver equal to the downlink frequency, and receives the downlink random access channel in the FDD mode. For this purpose, the controller oscillates according to the frequency of the frequency oscillator for receiving to the frequency of the downlink. In the second embodiment, the base station instantaneously transmits the reference signal through the uplink channel of the FDD mode. To do this, the controller oscillates the frequency of the frequency oscillator for transmitting to the frequency of the uplink.

Figure 12:
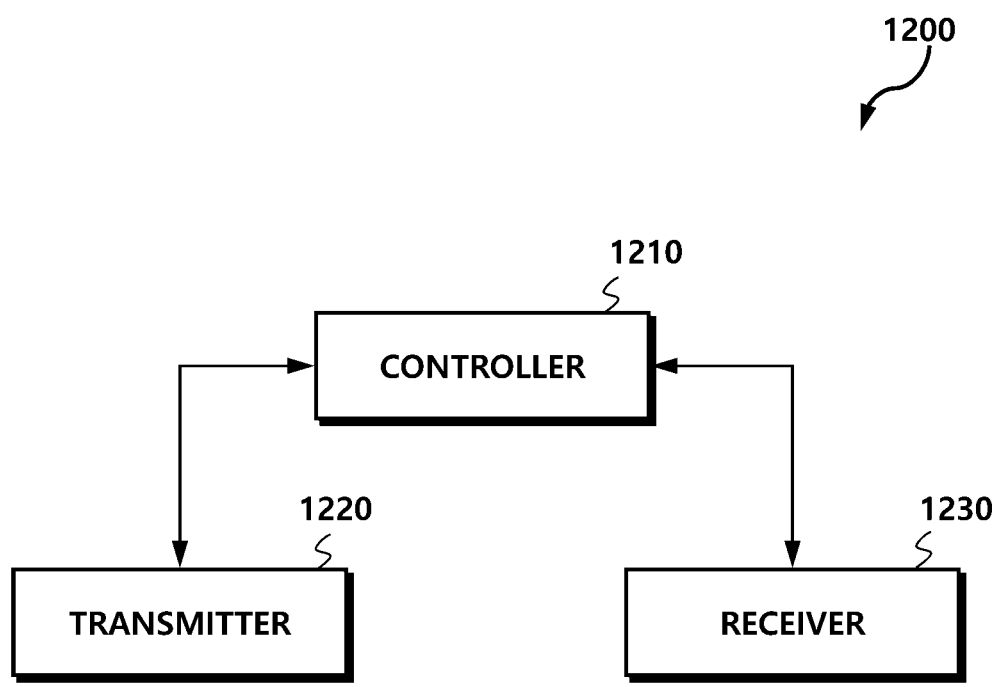
FIG. 12 is a diagram illustrating a configuration of the base station as the other example according to further another embodiment of the present invention.

FIG. 12 is a diagram illustrating a configuration of the base station as the other example according to further another embodiment of the present invention.

The base station 120 according to yet another embodiment of the present for receiving a random access channel in the FDD (Frequency Division Duplex) mode comprises a controller 1210 for generating a reference signal for measuring the quality of a transmission channel at which a terminal transmits a random access channel through the transmission channel, a transmitter 1220 for transmitting the reference signal through the transmission channel, and a receiver 1230 for receiving the random access channel through the transmission channel.

Referring to FIG. 12, the base station 1200 according to yet another embodiment of the present invention comprises the controller 1210, the transmitter 1220, and receiver 1230.

The receiver 1230 receives data and messages from the terminal through the corresponding channel. Also, the receiver 1230 can receive the random access channel described above. That is, the receiver 1230 can transmit the random access channel from the terminal through the corresponding transmission channel. The transmission channel may be the downlink channel or the uplink channel and may be set differently according to each of the above-described embodiments.

The controller 1210 may generate the reference signal for measuring the quality of the transmission channel through which the terminal transmits the random access channel. In addition, the controller 1210 controls the overall operation of the base station according to the reception of the channel adaptive random access channel necessary for performing the above-described present invention. Further, the controller 1210 can generate a signal for setting the transmission mode, and may generate the transmission parameter and the reference signal parameter.

The transmitter 1220 may transmit the reference signal through the transmission channel. The reference signal may be transmitted on the transmission channel of the random access channel. In other words, it may be transmitted through the downlink channel or may be transmitted through the uplink channel depending on each of the above embodiments. In addition, the transmitter 1220 may transmit the transmission parameter through the broadcast channel. The transmission parameter may include at least one of transmission interval information, transmission resource information, and transmission interval information to transmit the random access channel in the downlink channel, as described above. Also, the transmitter 1220 can transmit information on the transmission mode including information related to the normal mode or the disaster mode to the terminal.

In addition, the transmitter 1220 transmits control information, data, and a message to the terminal through the corresponding channel.

As described above, according to the present invention, the terminal operating in the FDD mode accurately measures the channel quality of the transmission channel to which the random access channel is to be transmitted, and performs the random access channel only when the channel condition is good.

Also, the present invention provides an effect of improving the coverage of the random access channel of the base station by determining whether to transmit the random access channel according to channel conditions when the base station is located far away from the base station, such as the disaster situation.

Although at least one preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of at least one embodiment of the present disclosure shall be construed on the basis of the accompanying claims in such a manner that all of the technical ideas included within the scope equivalent to the claims belong to the present disclosure.

CROSS-REFERENCE TO RELATED APPLICATION

This patent application claims priority under 35 U.S.C. § 119(a) on Korean Patent Application No. 10-2014-0103873 & 10-2014-0181988, filed on Aug. 11, 2014 & Dec. 17, 2014, the disclosure of which is incorporated herein by reference. In addition, this patent application claims priorities in countries other than U.S., with the same reason based on the Korean Patent Application, the entire contents of which are incorporated herein by reference.

The invention claimed is:

1. A method for transmitting a random access channel by a terminal in a Frequency Division Duplex (FDD) mode, the method comprising: setting a transmission mode to a first mode from among a plurality of transmission modes of the random access channel, wherein the plurality of transmission modes of the random access channel comprise the first mode in which the reference signal and the random access channel are transmitted through a same frequency band, and a second mode in which the reference signal and the random access channel are transmitted through different frequency bands; receiving a reference signal from a base station through a frequency band of a transmission channel; measuring a quality of the frequency band of the transmission channel using the reference signal; determining a timing for transmitting a random access channel based on the quality of the frequency band of the transmission channel; and transmitting the random access channel to the base station through the frequency band of the transmission channel based on the timing, according to the first mode.

2. The method according to claim 1, wherein the transmitting comprises triggering a transmission of the random access channel if the quality of the transmission channel is more than a reference value and an event which requires the transmission of the random access channel has occurred.

3. The method according to claim 1, further comprising receiving system information comprising a transmission parameter for transmitting the random access channel,
   wherein the frequency band of the transmission channel is a frequency band for a downlink channel of the FDD mode.

4. The method according to claim 3, wherein the transmission parameter comprises one or more of information about a transmission interval during which the random access channel is transmitted in the frequency band for the downlink channel, information about transmission resource, and information about a period of the transmission interval.

5. The method according to claim 4, wherein the transmission interval is an interval during which no downlink data is scheduled to be transmitted in the frequency band for the downlink channel.

6. The method according to claim 1, further comprising receiving system information comprising a reference signal parameter for receiving the reference signal, and
   wherein the frequency band of the transmission channel is a frequency band for an uplink channel of the FDD mode.

7. The method according to claim 6, wherein the reference signal parameter comprises one or more of information about a reception interval during which the reference signal is received in the frequency band for the uplink channel, information about transmission resource, and information about a period of the reception interval.

8. The method according to claim 7, wherein the reception interval is an interval during which no uplink data is scheduled to be transmitted in the frequency band for the uplink channel.

9. A method for receiving a random access channel by a base station in a Frequency Division Duplex (FDD) mode, the method comprising: setting a transmission mode to a first mode from among a plurality of transmission modes of the random access channel, wherein the plurality of transmission modes of the random access channel comprise the first mode in which the reference signal and the random access channel are transmitted through a same frequency band, and a second mode in which the reference signal and the random access channel are transmitted through different frequency bands; generating a reference signal for measuring a quality of a frequency band of a transmission channel; transmitting the reference signal to a terminal through the frequency band of the transmission channel; and receiving the random access channel from the terminal through the frequency band of the transmission channel, according to the first mode.

10. The method according to claim 9, further comprising transmitting system information comprising a transmission parameter for transmitting the random access channel,
   wherein the frequency band of the transmission channel is a frequency band for a downlink channel of the FDD mode.

11. The method according to claim 10, wherein the transmission parameter comprises one or more of information about a transmission interval during which the random access channel is transmitted in the frequency band for the downlink channel, information about transmission resource, and information about a period of the transmission interval.

12. The method according to claim 11, wherein the transmission interval is an interval during which no downlink data is scheduled to be transmitted in the frequency band for the downlink channel.

13. The method according to claim 9, further comprising receiving system information comprising a reference signal parameter for transmitting the reference signal,
   wherein the frequency band of the transmission channel is a frequency band for an uplink channel of the FDD mode.

14. The method according to claim 13, wherein the reference signal parameter comprises one or more of information about a reception interval during which the reference signal is transmitted in the frequency band for the uplink channel, information about transmission resource, and information about a period of the reception interval.

15. The method according to claim 14, wherein the reception interval is an interval during which no uplink data is scheduled to be transmitted in the frequency band for the uplink channel.

16. A terminal for transmitting a random access channel in a Frequency Division Duplex (FDD) mode, the terminal comprising: a receiver configured to receive a reference signal from a base station through a frequency band of a transmission channel; a controller configured to: set a transmission mode from among a plurality of transmission modes of the random access channel, wherein the plurality of transmission modes of the random access channel comprise a first mode in which the reference signal and the random access channel are transmitted through a same frequency band, and a second mode in which the reference signal and the random access channel are transmitted through different frequency bands; and based on the transmission mode being set to the first mode, measure a quality of the frequency band of the transmission channel using the reference signal and determine a timing for transmitting a random access channel based on the quality of the frequency band of the transmission channel; and a transmitter configured to transmit the random access channel to the base station through the frequency band of the transmission channel based on the timing.

17. A base station for receiving a random access channel in a Frequency Division Duplex (FDD) mode, the base station comprising: a controller configured to set a transmission mode from among a plurality of transmission modes of the random access channel and generate a reference signal for measuring a quality of a frequency band of a transmission channel, wherein the plurality of transmission modes of the random access channel comprise a first mode in which the reference signal and the random access channel are transmitted through a same frequency band, and a second mode in which the reference signal and the random access channel are transmitted through different frequency bands; a transmitter configured to transmit the reference signal to a terminal through the frequency band of the transmission channel; and a receiver configured to, based on the transmission mode being set to the first mode, receive the random access channel from the terminal through the frequency band of the transmission channel.

* * * * *